US011657391B1

(12) United States Patent
Blankstein et al.

(10) Patent No.: US 11,657,391 B1
(45) Date of Patent: May 23, 2023

(54) SYSTEM AND METHOD FOR INVOKING SMART CONTRACTS

(71) Applicant: Hiro Systems PBC, New York, NY (US)

(72) Inventors: Aaron Blankstein, Chicago, IL (US); Jude Nelson, New Brunswick, NJ (US)

(73) Assignee: Hiro Systems PBC, New York, NY (US)

( * ) Notice: Subject to any disclaimer, the term of this patent is extended or adjusted under 35 U.S.C. 154(b) by 626 days.

(21) Appl. No.: 16/422,432

(22) Filed: May 24, 2019

(51) Int. Cl.
*G06F 16/182* (2019.01)
*G06Q 20/38* (2012.01)
*G06Q 20/36* (2012.01)
*H04L 9/06* (2006.01)
*G06Q 20/40* (2012.01)
*G06F 9/455* (2018.01)

(52) U.S. Cl.
CPC ..... *G06Q 20/3829* (2013.01); *G06F 9/45533* (2013.01); *G06F 16/182* (2019.01); *G06Q 20/3672* (2013.01); *G06Q 20/405* (2013.01); *H04L 9/0637* (2013.01)

(58) Field of Classification Search
CPC .......... G06Q 20/3829; G06Q 20/3672; G06Q 20/405; G06F 16/182; G06F 9/45533; H04L 9/0637
See application file for complete search history.

(56) References Cited

U.S. PATENT DOCUMENTS

| | | | |
|---|---|---|---|
| 5,237,681 A | 8/1993 | Kagan et al. | |
| 5,455,953 A | 10/1995 | Russell | |
| 5,475,819 A | 12/1995 | Miller et al. | |
| 5,862,325 A | 1/1999 | Reed et al. | |
| 5,987,479 A | 11/1999 | Oliver | |
| 6,279,111 B1 | 8/2001 | Jensenworth et al. | |
| 6,345,288 B1 | 2/2002 | Reed et al. | |
| 6,351,812 B1 | 2/2002 | Datar et al. | |
| 6,418,169 B1 | 7/2002 | Datari | |
| 6,484,182 B1 | 11/2002 | Dunphy et al. | |
| 6,961,858 B2 | 11/2005 | Fransdonk | |
| 7,020,635 B2 | 3/2006 | Hamilton et al. | |
| 7,039,688 B2 | 5/2006 | Matsuda et al. | |
| 7,080,049 B2 | 7/2006 | Truitt et al. | |
| 7,090,128 B2 | 8/2006 | Farley et al. | |
| 7,107,462 B2 | 9/2006 | Fransdonk | |
| 7,150,045 B2 | 12/2006 | Koelle et al. | |
| 7,194,621 B1 | 3/2007 | Nguyen et al. | |
| 7,337,332 B2 | 2/2008 | Tsuria et al. | |
| 7,587,502 B2 | 9/2009 | Crawford et al. | |
| 7,711,586 B2 | 5/2010 | Aggarawal et al. | |
| 7,845,568 B2 | 12/2010 | Parlange et al. | |

(Continued)

OTHER PUBLICATIONS

U.S. Appl. No. 16/422,483, filed May 24, 2019, Blankstein et al.

(Continued)

*Primary Examiner* — Alex Gofman
*Assistant Examiner* — Erich Alexander Fischer
(74) *Attorney, Agent, or Firm* — Knobbe Martens Olson & Bear LLP

(57) ABSTRACT

The source code of a smart contract defines a schema with a map name, a key-tuple, and a value-tuple. The key-tuple can be populated with a value associated with a native field name that is associated with the principal that created a transaction.

11 Claims, 6 Drawing Sheets

(56) References Cited

U.S. PATENT DOCUMENTS

| | | |
|---|---|---|
| 7,996,351 B1 | 8/2011 | Leffert et al. |
| 8,095,929 B1 | 1/2012 | Ji et al. |
| 8,333,321 B2 | 12/2012 | Gressel et al. |
| 8,607,059 B2 | 12/2013 | Mason et al. |
| 8,768,838 B1 | 7/2014 | Hoffman |
| 8,935,257 B1 | 1/2015 | Vemuri et al. |
| 9,640,002 B1 | 5/2017 | Grosberg |
| 10,050,787 B1 | 8/2018 | Johansson et al. |
| 10,089,801 B1 | 10/2018 | Musabeyoglu et al. |
| 10,108,460 B2 | 10/2018 | Gopisetty et al. |
| 10,121,025 B1 | 11/2018 | Rice |
| 10,296,411 B1 | 5/2019 | Diggins et al. |
| 10,360,363 B1 | 7/2019 | Grosberg |
| 10,419,541 B2 | 9/2019 | Harrison et al. |
| 10,454,906 B1 | 10/2019 | Sharfman et al. |
| 10,601,829 B1 | 3/2020 | Nelson et al. |
| 10,699,269 B1 | 6/2020 | Blankstein et al. |
| 2001/0051876 A1 | 12/2001 | Seigel et al. |
| 2002/0049900 A1 | 4/2002 | Patrick |
| 2002/0116172 A1 | 8/2002 | Vargas |
| 2002/0169865 A1 | 11/2002 | Tarnoff |
| 2002/0193142 A1 | 12/2002 | Stavenow et al. |
| 2003/0037139 A1 | 2/2003 | Shteyn |
| 2003/0070091 A1 | 4/2003 | Loveland |
| 2003/0135748 A1 | 7/2003 | Yamada et al. |
| 2004/0078604 A1 | 4/2004 | Rice et al. |
| 2004/0192306 A1 | 9/2004 | Elkarat et al. |
| 2005/0198521 A1 | 9/2005 | Nakazawa |
| 2005/0262399 A1 | 11/2005 | Brown et al. |
| 2006/0022048 A1 | 2/2006 | Johnson |
| 2006/0098815 A1 | 5/2006 | O'Neil |
| 2006/0143134 A1 | 6/2006 | So et al. |
| 2006/0234679 A1 | 10/2006 | Matsumoto et al. |
| 2006/0247866 A1 | 11/2006 | Mishima et al. |
| 2007/0032664 A1 | 2/2007 | Butler et al. |
| 2007/0168524 A1 | 7/2007 | Chao et al. |
| 2007/0180227 A1 | 8/2007 | Akimoto |
| 2007/0198434 A1 | 8/2007 | Jang et al. |
| 2007/0265980 A1 | 11/2007 | Sehgal |
| 2007/0270161 A1 | 11/2007 | Hampel et al. |
| 2007/0289002 A1 | 12/2007 | van der Horst et al. |
| 2008/0059390 A1 | 3/2008 | Cox et al. |
| 2008/0077494 A1 | 3/2008 | Ozveren et al. |
| 2008/0127149 A1 | 5/2008 | Kosche et al. |
| 2008/0155538 A1 | 6/2008 | Pappas |
| 2008/0177756 A1 | 7/2008 | Kosche et al. |
| 2008/0215436 A1 | 9/2008 | Roberts |
| 2008/0277482 A1 | 11/2008 | Parlange et al. |
| 2008/0319910 A1 | 12/2008 | Duffus et al. |
| 2009/0143048 A1 | 6/2009 | Ayanamcottil et al. |
| 2009/0178123 A1 | 7/2009 | Carpenter et al. |
| 2009/0187463 A1 | 7/2009 | daCosta |
| 2009/0222329 A1 | 9/2009 | Ramer et al. |
| 2009/0271847 A1 | 10/2009 | Karjala et al. |
| 2009/0312011 A1 | 12/2009 | Huomo et al. |
| 2010/0024040 A1 | 1/2010 | Nimura et al. |
| 2010/0106597 A1 | 4/2010 | Jayakody |
| 2010/0131351 A1 | 5/2010 | Kazan et al. |
| 2010/0317371 A1 | 12/2010 | Westerinen et al. |
| 2011/0055927 A1 | 3/2011 | Hamilton et al. |
| 2011/0113377 A1 | 5/2011 | Lategan |
| 2011/0145927 A1 | 6/2011 | Hubner et al. |
| 2011/0162035 A1 | 6/2011 | King et al. |
| 2011/0202269 A1 | 8/2011 | Raventlow |
| 2011/0258049 A1 | 10/2011 | Ramer et al. |
| 2012/0057741 A1 | 3/2012 | Macklin et al. |
| 2012/0075057 A1 | 3/2012 | Fyke et al. |
| 2012/0075059 A1 | 3/2012 | Fyke et al. |
| 2012/0077431 A1 | 3/2012 | Fyke et al. |
| 2012/0078727 A1 | 3/2012 | Lee |
| 2012/0143763 A1 | 6/2012 | Karp et al. |
| 2012/0173358 A1 | 7/2012 | Soroca et al. |
| 2012/0179564 A1 | 7/2012 | Soroca et al. |
| 2012/0190386 A1 | 7/2012 | Anderson |
| 2012/0196529 A1 | 8/2012 | Huomo et al. |
| 2012/0220216 A1 | 8/2012 | Carbonell Duque et al. |
| 2013/0007470 A1 | 1/2013 | Violleau et al. |
| 2013/0036458 A1 | 2/2013 | Liberman et al. |
| 2013/0066637 A1 | 3/2013 | Seto et al. |
| 2013/0074058 A1 | 3/2013 | Gounares et al. |
| 2013/0139241 A1 | 5/2013 | Leeder |
| 2013/0174046 A1 | 7/2013 | Lim et al. |
| 2013/0185749 A1 | 7/2013 | Bill |
| 2013/0254787 A1 | 9/2013 | Cox et al. |
| 2013/0311988 A1 | 11/2013 | Boss et al. |
| 2013/0318157 A1 | 11/2013 | Harrison |
| 2013/0331027 A1 | 12/2013 | Rose et al. |
| 2014/0189808 A1 | 7/2014 | Mahaffey et al. |
| 2014/0215076 A1 | 7/2014 | Grothues |
| 2014/0222889 A1 | 8/2014 | Bello et al. |
| 2014/0365304 A1 | 12/2014 | Showers et al. |
| 2015/0089614 A1 | 3/2015 | Mathew et al. |
| 2015/0169824 A1 | 6/2015 | Kermani et al. |
| 2015/0172211 A1 | 6/2015 | Bello et al. |
| 2015/0220917 A1 | 8/2015 | Aabye et al. |
| 2015/0244706 A1 | 8/2015 | Grajek et al. |
| 2016/0104004 A1 | 4/2016 | Vadapandeshwara et al. |
| 2016/0110537 A1 | 4/2016 | Harrison |
| 2016/0112770 A1 | 4/2016 | Harrison |
| 2016/0140122 A1 | 5/2016 | Harrison |
| 2016/0180618 A1 | 6/2016 | Ho et al. |
| 2016/0307380 A1 | 10/2016 | Ho et al. |
| 2016/0350146 A1 | 12/2016 | Udupi et al. |
| 2017/0041655 A1 | 2/2017 | Harrison et al. |
| 2017/0083590 A1 | 3/2017 | Jagarlamudi et al. |
| 2017/0085651 A1 | 3/2017 | Harrison et al. |
| 2017/0201850 A1 | 7/2017 | Raleigh et al. |
| 2017/0236123 A1 | 8/2017 | Ali et al. |
| 2017/0277246 A1 | 9/2017 | Nicholson et al. |
| 2017/0277550 A1 | 9/2017 | Zhang et al. |
| 2017/0277551 A1 | 9/2017 | Nicholson et al. |
| 2017/0286145 A1 | 10/2017 | Anand et al. |
| 2017/0289197 A1 | 10/2017 | Mandyam et al. |
| 2018/0005186 A1 | 1/2018 | Hunn |
| 2018/0108192 A1 | 4/2018 | Ho et al. |
| 2018/0144563 A1 | 5/2018 | Reymann |
| 2018/0218415 A1 | 8/2018 | Nakahara et al. |
| 2018/0247191 A1 | 8/2018 | Katz et al. |
| 2018/0365201 A1 | 12/2018 | Hunn et al. |
| 2019/0005496 A1 | 1/2019 | Noe et al. |
| 2019/0034246 A1 | 1/2019 | Miller et al. |
| 2019/0050855 A1 | 2/2019 | Martino et al. |
| 2019/0080392 A1 | 3/2019 | Youb et al. |
| 2019/0081793 A1 | 3/2019 | Martino et al. |
| 2019/0102163 A1 | 4/2019 | Witherspoon |
| 2019/0163896 A1 | 5/2019 | Balaraman et al. |
| 2019/0164153 A1 | 5/2019 | Agrawal et al. |
| 2019/0171438 A1 | 6/2019 | Franchitti |
| 2019/0182257 A1 | 6/2019 | Lee et al. |
| 2019/0207910 A1 | 7/2019 | Darling et al. |
| 2019/0228269 A1 | 7/2019 | Brent et al. |
| 2019/0238525 A1 | 8/2019 | Padmanabhan |
| 2019/0251124 A1 | 8/2019 | Pan et al. |
| 2019/0279247 A1 | 9/2019 | Finken et al. |
| 2019/0312800 A1 | 10/2019 | Schibler et al. |
| 2019/0319794 A1 | 10/2019 | Haidar |
| 2019/0319940 A1 | 10/2019 | Hamel et al. |
| 2019/0324958 A1 | 10/2019 | Ow et al. |
| 2019/0325044 A1* | 10/2019 | Gray .................... G06F 16/284 |
| 2019/0325432 A1 | 10/2019 | Ow et al. |
| 2019/0349254 A1 | 11/2019 | Nolan et al. |
| 2019/0349426 A1 | 11/2019 | Smith et al. |
| 2019/0370800 A1* | 12/2019 | Song .................. G06Q 20/3829 |
| 2019/0373521 A1 | 12/2019 | Crawford |
| 2020/0065763 A1 | 2/2020 | Rosinzonsky et al. |
| 2020/0322129 A1 | 10/2020 | Wei et al. |
| 2020/0364207 A1 | 11/2020 | Zhuo |
| 2020/0372502 A1 | 11/2020 | Blankstein et al. |
| 2021/0081185 A1 | 3/2021 | Wright et al. |

(56) References Cited

U.S. PATENT DOCUMENTS

2021/0157798 A1  5/2021  Yu et al.
2021/0165686 A1  6/2021  Yang et al.

OTHER PUBLICATIONS

U.S. Appl. No. 16/422,707, filed May 24, 2019, Blankstein et al.
Ali, Muneeb, Dissertation, Trust-to-Trust Design of a New Internet, dated Jun. 2017.
Ali, Muneeb et al., Blockstack: A New Decentralized Internet, dated May 2017.
Ali, Muneeb et al., Blockstack: A New Internet for Decentralized Applications, dated Oct. 2017.
Ali, Muneeb et al., Blockstack: A Global Naming and Storage System Secured by Blockchains. In Proceedings of the 2016 USENIX Annual Technical Conference, Jun. 2016.
Ali, Muneeb et al., Bootstrapping Trust in Distributed Systems with Blockchains. In USENIX ;login 41(3):52-58, Fall 2016.
Ali, Muneeb et al., The Blockstack Decentralized Computing Network, dated May 30, 2019.
Nelson, Jude et al., Extending Existing Blockchains with Virtualchain. In Workshop on Distributed Cryptocurrencies and Consensus Ledgers, 2016.
Nelson, Jude, Dissertation: Wide-Area Software-Defined Storage, dated Jun. 2018.
O'Connor, Russell, Simplicity: A New Language for Blockchains, dated Dec. 2017.
Popejoy, Stuart, The Pact Smart-Contract Language, dated Jun. 2017.
SIP-002 Smart Contract Language #892, available at https://github.com/blockstack/blockstack-core/pull/892/files/d8d908797244fc7768f1e845c082c13d33c29d3d, dated Dec. 10, 2018.
Patsonakis et al., An Alternative Paradigm for Developing and Pricing Storage on Smart Contract Platforms, University of Athens, Feb. 3, 2019.
Buterin, Vitak. (2018). Vyper Documentation, [retrieved on Feb. 23, 2022]. Retrieved from the Internet: https://buildmedia.readthedocs.org/media/pdf/viper/latest/viper.pdf. (Year: 2018).
Wang, Peng. (2019). Type System for Resource Bounds with Type-Preserving Compilation. Ph.d Thesis. Massachusetts Institute of Technology. [retrieved on Feb. 23, 2022]. Retrieved from the Internet: https://people.csail.mit.edu/wangpeng/phd-thesis.pdf. (Year: 2019).
Tikhomirov et al., SmartCheck: Static Analysis of Ethereum Smart Contracts, 2018 ACM/IEEE, 2018.
"Solidity-Docs-Solidity in Depth-Types." Downloaded on Jul. 16, 2021. Obtained from https://docs.soliditylang.org/en/v0.5.3/types.html (Year: 2021).
Chen et al (Towards Saving Money in Using Smart Contracts) (Year: 2018).

* cited by examiner

SYSTEM AND METHOD FOR INVOKING SMART CONTRACTS

INCORPORATION BY REFERENCE

The following U.S. Patent Applications, filed on May 24, 2019, are incorporated by reference in their entirety (including the written description, claims, and drawings) for all that they disclose: Ser. No. 16/422,483 (entitled DEFINING DATA STORAGE WITHIN SMART CONTRACTS) and Ser. No. 16/422,707 (entitled SYSTEM AND METHOD FOR SMART CONTRACT PUBLISHING).

BACKGROUND

Field

This disclosure generally relates to networks implementing a blockchain. More specifically, this disclosure relates to smart contracts in a blockchain-based network.

Description of the Related Art

Blockchain is a distributed digital ledger that allows multiple parties to engage in secure, trusted transactions with one another without an intermediary. The blockchain itself can include a chain of blocks that are linked together cryptographically, with each block in the chain storing one or more transactions and the number of blocks in the chain growing over time. For example, a transaction can include a cryptocurrency payment, submission of an online vote, and/or any other type of exchange or event. The blocks can be linked together using a cryptographic hash. For example, each block can include a cryptographic hash of a previous block in the chain. Because each block includes a cryptographic hash of a previous block in the chain, a transaction stored in one block cannot be altered without all subsequent blocks being altered as well. The likelihood that all subsequent blocks being altered is low given that such an alteration would require approval from a majority of the computing devices or participants participating in the blockchain.

Some applications use a blockchain to automate actions or functions. Because blockchains are programmable, developers can encode certain conditions and outcomes so transactions over the network happen automatically. This application is often referred to as a "smart contract," a computer protocol that can facilitate, verify, and enforce the performance of an action or contract on a blockchain. In this interpretation, used for example by the Ethereum Foundation or IBM, a smart contract is not necessarily related to the classical concept of a legally binding contract, but can be any kind of business rules encoded in software.

SUMMARY

The systems, methods, and devices described herein each have several aspects, no single one of which is solely responsible for its desirable attributes. Without limiting the scope of this disclosure, several non-limiting features will now be discussed briefly.

Systems and/or computer systems are disclosed that comprise a computer readable storage medium having program instructions embodied thereon, and one or more processors configured to execute the program instructions to cause the one or more processors to perform operations comprising one or more aspects of the above- and/or below-described embodiments (including one or more aspects of the appended claims).

Computer-implemented methods are disclosed in which, by one or more processors executing program instructions, one or more aspects of the above- and/or below-described embodiments (including one or more aspects of the appended claims) are implemented and/or performed.

Computer program products comprising a computer readable storage medium are also disclosed, wherein the computer readable storage medium has program instructions embodied thereon the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

Throughout the drawings, reference numbers may be (but are not necessarily) reused to indicate corresponding elements. The drawings are provided to illustrate example embodiments described herein and are not intended to limit the scope of the disclosure.

DETAILED DESCRIPTION

Blockchains are decentralized digital ledgers that record information distributed among a network of computers. The decentralized digital ledgers ensure each computer has identical records. Blockchain technologies consist of three fundamental components: cryptographically linked data structures, networking, and consensus protocols.

Figure 1:
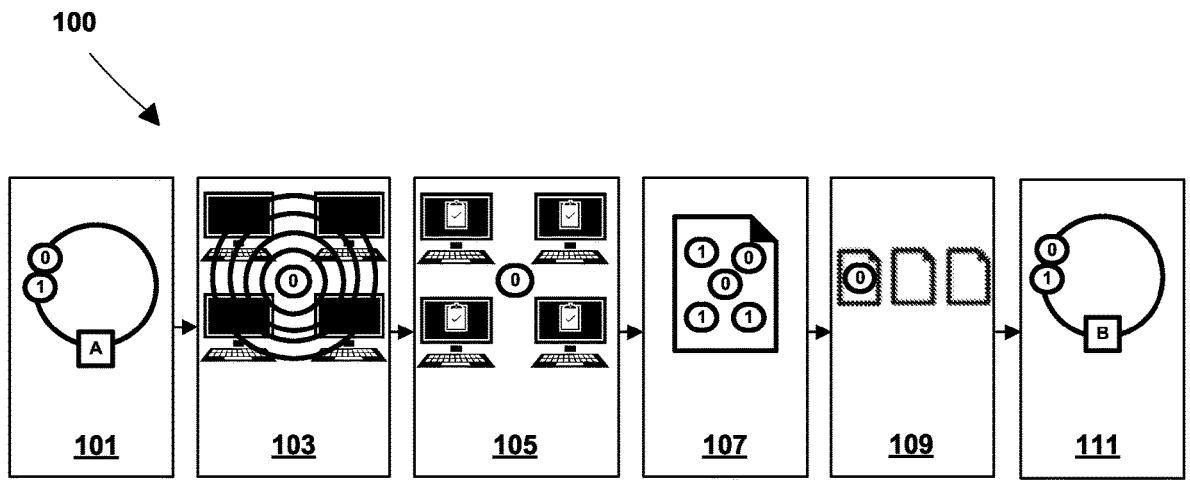
FIG. 1 provides an overview of a blockchain network.

First, a blockchain consists of a series of digital "blocks" that are securely linked together in sequential order using cryptography to create a virtual chain of data. These blocks record information such as financial transactions, agreements between parties, and ownership records, as shown in FIG. 1, which provides an overview of a blockchain network 100. In block 101 of FIG. 1, a transaction to transfer a digital coin from user A to user B is initiated by user A. In block 103, the transaction is broadcast to every node in the network. In block 105, the nodes form a consensus on whether the transaction is valid. In block 107, the nodes add valid transactions to a "block." In step 109, the block is added to the blockchain. In step 111, the transaction is complete and the digital coin transfers to user B (e.g., user B).

Second, a blockchain runs on a distributed network of computers. Computers in the network, also referred to as nodes, store copies of the blockchain, validate that the blockchain has not been tampered with, and verify when transactions can be added to a new block. Nodes share and synchronize all updates. Although a blockchain network implements nodes, computing devices do not need to be nodes to participate in the blockchain network. For example, Internet of Things (IoT) devices can operate on a blockchain as "light nodes," which do not store the complete blockchain but rather only a portion of each block—just enough to validate the authenticity of transactions. To be clear, a node does not need to represent a distinct machine. Multiple nodes can run on the same machine (e.g., one node per core).

Finally, blockchains maintain agreement between participants using a "consensus protocol"—a set of rules that allows nodes to determine when to add new information to the blockchain. Consensus protocols are designed to make the blockchain resistant to tampering and ensure consistency in the data among all participants in the network.

In general, a blockchain is a global append-only log. Writes to the global append-only log are called transactions, and transactions are organized into blocks. Thus, each block can include or package a single transaction or multiple transactions. Writing to the global append-only log (e.g., writing to a block) requires a payment in the form of a transaction fee.

Some applications use blockchain to automate actions or functions. Because blockchains can be programmable, developers can encode certain conditions and outcomes so transactions over the network happen automatically. This application is often referred to as a "smart contract," a computer protocol that can facilitate, verify, and enforce the performance of an action or contract on a blockchain.

The term "smart contracts" is somewhat of a misnomer. They are typically business rules encoded in software, and they are not necessarily binding in the legal sense. Smart contracts can be beneficial because they have a disintermediating effect when combined with a blockchain. By creating an agreement between several parties that automatically executes once the terms are reached, there is no need to have a third party execute those terms. As such, smart contract applications improve efficiencies of various applications, such as automating reporting, compliance, and processing; facilitating automatic payment of dividends from securities, derivatives, and other financial instruments; and automatically releasing or destroying data.

A smart contract is typically composed of two parts: a data space and a set of functions. The data space usually includes a set of tables of data that only the contract can modify. The set of functions operates within the data space of the smart contract. Depending on the smart contract, the set of functions may call functions from other smart contracts. While a smart contract cannot modify other smart contracts' data maps directly, a smart contract can read data stored in this smart contracts' data maps. An appropriate function can be defined at the scheme level to allow for reading data maps across smart contracts, by passing the smart contract identifier, the desired key-tuple, and the calling smart contract principal (the functionality of identifying a contract as principal is discussed in greater detail below). The data map name and contract principal arguments must be constants, specified at the time of publishing.

Ethereum is a popular blockchain platform for implementing smart contracts. At the heart of Ethereum is the Ethereum Virtual Machine (EVM), which can execute code of arbitrary algorithmic complexity. Every Ethereum node runs the EVM in order to maintain consensus across the Ethereum blockchain. Ethereum is "Turing complete," and developers can create applications that run on the EVM using programming languages modeled on, for example, JavaScript and Python.

Like executing other transactions, executing a smart contract is not "free" on the Ethereum blockchain. Rather, Ethereum assigns a fee or cost ("Gas Cost") associated with smart contract transactions. Because Ethereum is Turing complete, it is impossible to determine a priori whether a user has paid enough Gas to complete all runtime operations or functions for a smart contract. Instead, a user pays a certain amount of "Gas," and the EVM begins to step through a smart contract's functions. The EVM evaluates the Gas cost of the first functions, and if there is enough Gas to continue, it subtracts the Gas cost from the Gas that the user has paid for, evaluates the next functions, and continues, failing if it runs out of Gas before the execution of the functions is complete. The inventors realized that the Ethereum model presents a technical problem: because Ethereum is Turing complete, the Gas cost required to complete a smart contract cannot be known before the smart contract completes execution.

Definitions

In order to facilitate an understanding of the systems and methods discussed herein, some terms are defined below. These terms, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

A decentralized network is a computer network implementing computing devices that execute one or more consensus algorithms to eliminate the need for centralized decision making and/or control.

A high-level language is a computer programming language written such that its programs are not dependent the computer's hardware architecture.

A non-compiled language is a language in which instructions are executed directly without previously being compiled during machine-language instructions.

The terms "source code" and "language" are used interchangeably in this disclosure. It should be understood that source code is a broad term and not only encompasses sequential programming instructions but also other computer-readable statements in a computer-accessible document.

Overview

Various embodiments discussed herein present a technical solution to the technical problem discussed above. Such embodiments implement a smart contracting language that enables static analysis to be performed to determine properties of transactions before executing those transactions. For example, various embodiments allow a VM to count the total number of runtime operations required, the maximum amount of data writes, and/or the maximum number of calls to any expensive functions like data reads or hash computations. Notably, unlike Turing complete smart contracting language, this information is knowable before executing the smart contract.

Example Improved Blockchain Environment

Figure 2:
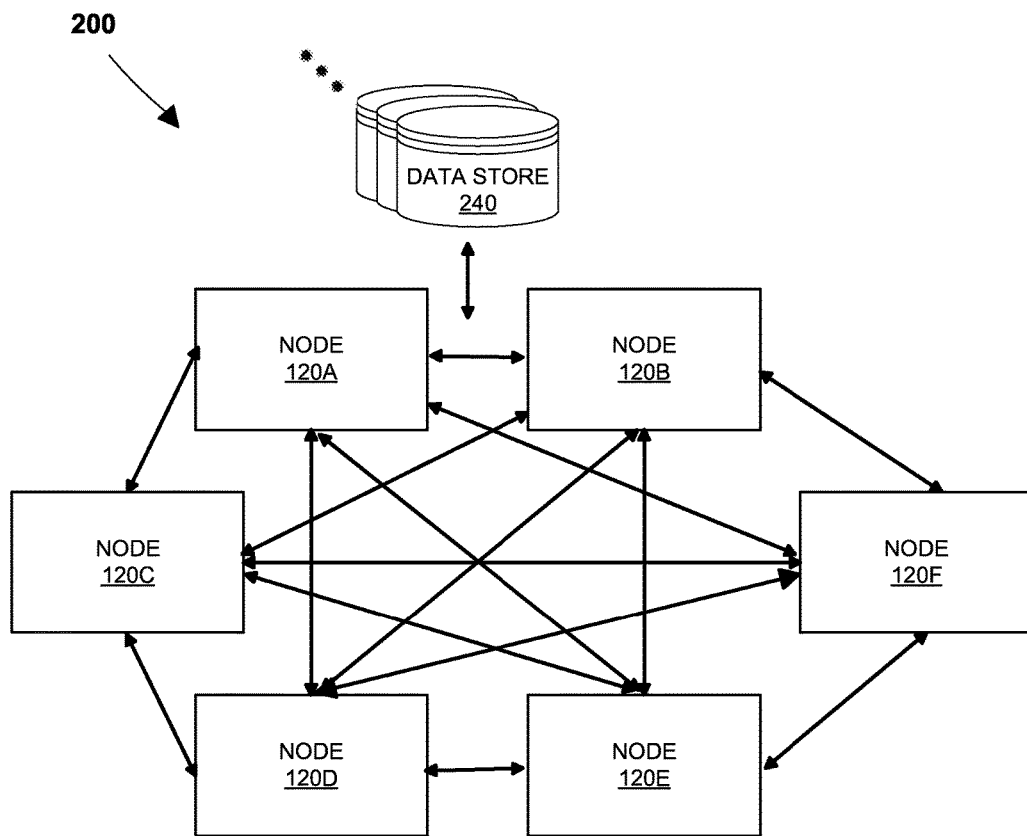
FIG. 2 is a block diagram of an illustrative operating environment in which an improved blockchain is implemented.

FIG. 2 is a block diagram of an illustrative operating environment 200 in which an improved blockchain is implemented.

Various nodes 220A-220F are present, along with one or more blockchain data stores 240. Each of the nodes 220A-220F may communicate with each other in a decentralized network (e.g., a peer-to-peer network). Each of the virtual chain nodes 220A-220F may further communicate with data store 240. In general, the nodes 220 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. As described in greater detail below, a node 220 can launch and execute one or more virtual machine (VM) instances, where each VM instance acts as a node in a decentralized network that implements the blockchain described herein and can be associated with a user or participant.

In particular, each VM instance running on each node 220 may store the same information, block information (e.g., data identifying committed transactions, block header data, etc.), etc. The VM instances may store the same information because each VM instance may broadcast a message to other VM instances when a transaction is stored. Because each VM instance receives and stores the same transaction data, each VM instance running on each node 220 has a copy of the same virtual chain. The VM instances can then independently perform the same operations.

A node 220 can launch and execute a VM instance as a standalone application. Alternatively, a node 220 can run an application within which the VM instance is launched and executed. For example, the application can be a mobile application.

While FIG. 2 illustrates six nodes 220A-220F in the operating environment 220, this is merely for illustrative purposes. The operating environment 200 may include fewer or preferably more nodes 220.

The data store 240 may store various data of the blockchain. For example, the data store 240 can store values, data types, and/or sizes of data map names, keys, and values associated with smart contracts. The blockchain data store 240 can also store runtime data and input and/or output data sizes associated with functions called within smart contracts. The blockchain data store 240 can also store data specific to various nodes 220 and/or VM instances running thereon. Data specific to a node 220 and/or a VM instance may be signed with a private key associated with the node 220 and/or the VM instance.

Figure 3:
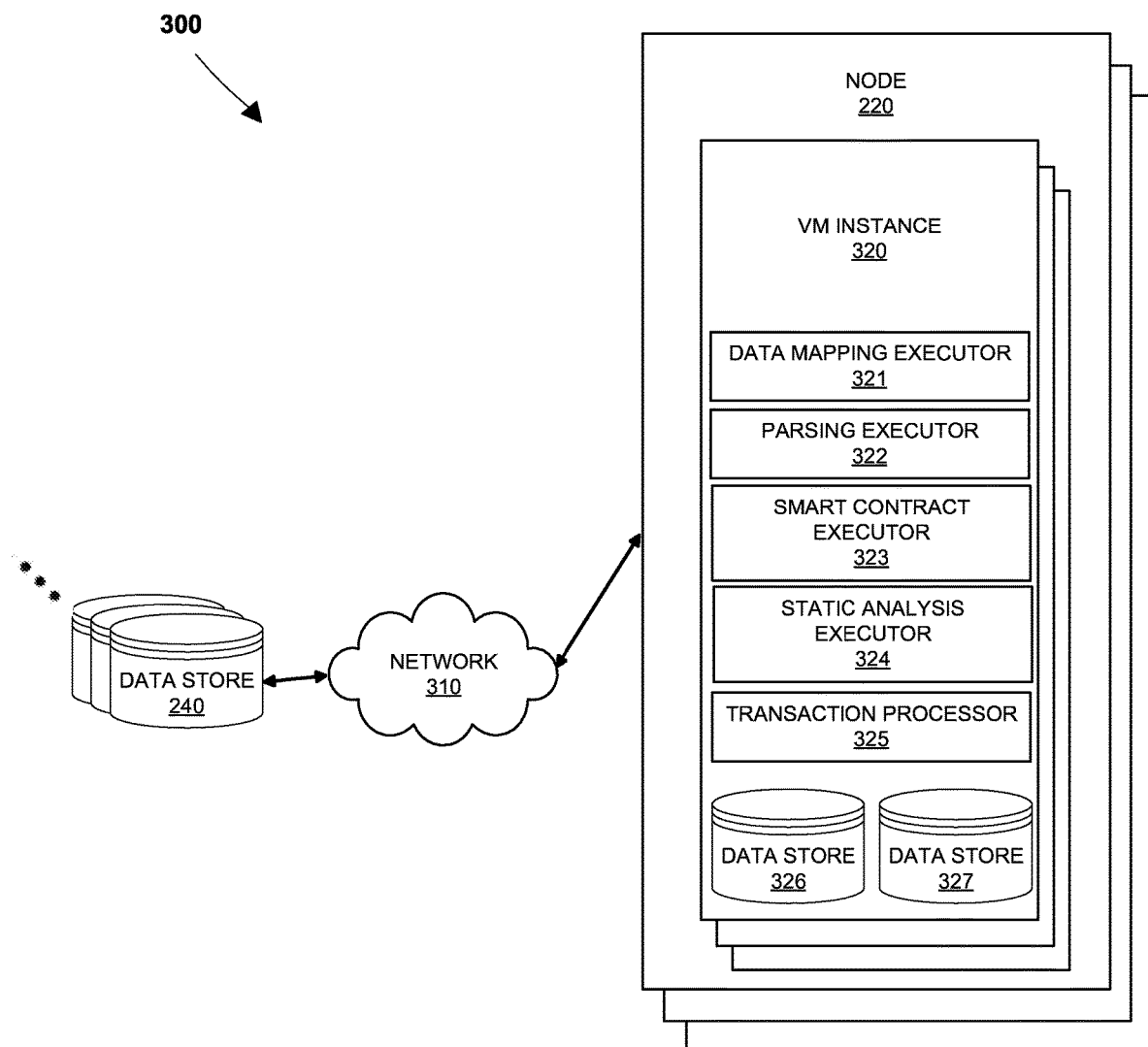
FIG. 3 is a block diagram of an illustrative operating environment in which an improved blockchain is implemented via one or more virtual machine (VM) instances.

FIG. 3 is a block diagram of an illustrative operating environment 300 in which an improved blockchain is implemented via one or more VM instances 320. The operating environment 300 includes various nodes 220 in communication with one or more data stores 240 via network 310. In addition, some or all of the nodes 220 may communicate with each other via the network 310.

The network 310 may include any wired network, wireless network, or combination thereof. For example, the network 310 may be a personal area network, local area network, wide area network, over-the-air broadcast network (e.g., for radio or television), cable network, satellite network, cellular telephone network, or combination thereof. As a further example, the network 310 may be a publicly accessible network of linked networks, possibly operated by various distinct parties, such as the Internet. In some embodiments, the network 310 may be a private or semi-private network, such as a corporate or university intranet. The network 310 may include one or more wireless networks, such as a Global System for Mobile Communications (GSM) network, a Code Division Multiple Access (CDMA) network, a Long Term Evolution (LTE) network, or any other type of wireless network. The network 310 can use protocols and components for communicating via the Internet or any of the other aforementioned types of networks. For example, the protocols used by the network 310 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are known to those skilled in the art and, thus, are not described in more detail herein.

As described above, each node 220 can launch and execute one or more VM instances 320. The VM instance 320 may include various components to implement the improved blockchain described herein. For example, the VM instance 320 may include a data mapping executor 321, a parsing executor 322, a smart contract executor 323, a static analysis executor 324, a transaction processor 325, a runtime data store 326, and a key/value data store 327, as well as other stores for storing the data described in this disclosure. The data mapping executor 321 can execute the functions relating to data mapping described below. The parsing executor 322 can execute the functions relating to building a parse tree described below. The smart contract executor 324 can execute the functions relating to executing a smart contract in response to a transaction, as described below. The static analysis executor 324 can perform the functions relating to traversing the parse tree and performing static analysis, as described below.

The transaction processor 324 can broadcast various messages indicating that a transaction has been stored or executed. For example, the transaction processor 324 of a VM instance 320 can broadcast that the VM instance 320 has submitted a public key registration transaction, a block commit transaction, and/or any other transaction. The transaction processor 324 can generate the transactions themselves (e.g., by obtaining data from other components). The transaction processor 324 is also suitable for performing any additional operations described as performed by the VM in this disclosure.

EXAMPLE IMPLEMENTATION

At least one embodiment of the invention is implemented in a computing device of a decentralized network. The computing device can, for example, be a node of a decentralized network, as discussed above. Through a hardware-implemented network interface, the computing device can be configured to receive smart contracts from the decentralized network. The received smart contracts each comprise a data space and a set of functions and are received as source code.

When processing a transaction that calls a smart contract function, the computing device can execute a virtual machine (VM) of a blockchain network, and the smart contract code is executed by the VM. The VM runs within the blockchain node software, but a VM is unique to each transaction execution, because the database connection persists state between them. Therefore, a single VM completes all transactions and resets its context every time it executes a different transaction.

A blockchain node reads transactions from the network, verifies them, and in reading and verifying the transactions, executes any smart contracts called by a transaction. The VM executes the smart contract code. The smart contracting VM can perform functions including: connecting to a database that stores data for the data maps discussed herein, publishing smart contracts to nodes on the blockchain network, and executing smart contract functions. When executing a smart contract function, the VM requires a contract identifier, the function name, the sender principal (discussed later in this disclosure), and any arguments for the function. The VM will return true or false if the function executes successfully.

As discussed above, the smart contract source code can be used on a blockchain network to support programmatic control over digital assets within the blockchain, such as names in a blockchain-based domain naming system, tokens, and so forth. The smart contract source can be used as the sole source code for programming smart contracts in the blockchain network. The smart contract source code can also be used in conjunction with other smart contract source code. For example, an application chain layer on a blockchain network may implement a first smart contract language while nodes of the blockchain network can validate application chains using an embodiment of the smart contracting source code.

An arbitrary smart contract of the received smart contracts will now be referred to as a "first smart contract." In at least one embodiment, the first smart contract is received as source code.

The data within the first smart contract's data space is allocated by a data map. Preferably, the data is not allocated by a table or set of tables. A data map relates a first typed-tuple (hereinafter referred to as a "key-tuple") to a second typed-tuple (hereinafter referred to as a "value-tuple"). Unlike a table, a data map associates a given key-tuple with exactly one value-tuple. While the value-tuples need not themselves be unique, the key-tuple/value-tuple pairs are unique. In other words, each data map is unique to a smart contract and a data map itself is mapping key-tuples that are unique to value-tuples.

Both key-tuples and value-tuples are typed, such that when a data map is declared or defined, the types are specified. These types establish a maximum possible size for key-tuples and value-tuples.

Certain embodiments include the inventive realization that a data map offers advantages over data structures utilized in other smart contract programming languages. Data maps allow for implementation within the VM and simplified reasoning about transactions (as discussed later in this disclosure). By inspecting a smart contract's functions, it becomes clear which data maps will be modified and even within those maps, which key-tuples are affected by a given function. In addition, the interface of data maps ensures that the return types of map operations are fixed length, which is required for static analysis of a smart contract's runtime, costs, and other properties.

Within the source code, the smart contract can implement a pre-defined function call to define the schema of a data map, for example, as shown in non-limiting Example 1.
(define-map factorials
    ((id int)) ((current int) (index int)))

Example 1

Here, define-map represents the non-limiting, pre-defined function call for defining a data map. Other function calls, such as defmap or any other pre-defined name, could also be implemented. The data map function call is preferably called in the top-level of the smart contract.

The data map function call accepts a name for the data map and a definition of the structure of the key-tuple and value-tuple types. The data map name in this example is factorials. Again, any data map name can be assigned by the smart contract programmer. The key-tuple includes one value id with the type integer. The value-tuple includes two values: current and index, both with the type integer. Within a data map, both the key-tuples and value-tuples are typed. When the data map is declared, the types are specified. These types are associated with a maximum size.

Suitable data types include Booleans, integers, fixed length buffers, and principals. Other data types with fixed or determinable size can be implemented. Data maps can also implement fixed-length lists of the foregoing data types. When implementing lists or buffers, the type contains a maximum length. In Example 2 below, the data nap named accounts has been defined to include the key-tuple that is a list of up to three integers and a value-tuple that is a buffer with a maximum length of 20 bytes. With this configuration, both the key-tuple and the value-tuple have maximum lengths.
define-map accounts
    (list integers 3) (buffer 20))

Example 2

At least one embodiment includes the inventive realization that, in a data map, when all data types (and lists comprising those data types) have a fixed or determinable size, the maximum possible size of all data allocated by the data map is known before executing the smart contract.

Within the source code, the smart contract can implement pre-defined functions, such as primitive functions defined at the schema level, to interact with a data map.

For example, value-tuples in a given data map can be inserted, set, fetched, or deleted implementing the primitive functions shown in Table 1. Here, map-name represents the given data map, key represents a key-tuple within the data map, and value represents a value-tuple associated with the key-tuple key within the data map. It should be appreciated that the names of the pre-defined functions can be assigned differently, depending on how the source code defines them.

TABLE 1

| Data space primitive | Description |
| --- | --- |
| (insert-entry! map-name key value) | Sets a value-tuple for key-tuple in map-name and returns true if and only if the value-tuple has not already been set, otherwise returns false |
| (set-entry! map-name key value) | Sets a value-tuple for key-tuple in map-name and returns true, irrespective of whether the value-tuple has already been set |
| (fetch-entry map-name key) | Returns the value-tuple associated with key-tuple in map-name or returns 'null if there is no such value-tuple |
| (delete-entry! map-name key value) | Deletes the value-tuple associated with key-tuple in map-name and returns true if and only if the value-tuple has already been set, otherwise returns false |

At least one embodiment includes the inventive realization that, because the data-type of each key-tuple is known when calling a smart contract, because primitive functions' return values are known, and because the maximum possible input and output sizes of the primitive functions are known, then it is possible to apply static analysis to calculate the maximum possible output sizes prior to executing the smart contract, depending on how the data primitives are called within a smart contract.

In at least one embodiment, the source code can implement a pre-defined function to allow the construction of a named tuple. For example, the pre-defined function tuple can allow the construction of a named tuple. Allowing the construction of named tuples using a pre-defined function is particularly useful for data maps where the key-tuples and/or value-tuples are greater than 1-tuples. To access a named component of a given tuple, an appropriate function, such as get, can return the item from the tuple.

To illustrate, one can apply the data space primitives of Table 1 to Example 1. Here, id represents a transaction identifier and can be set with the arbitrary integer value 100. The variable current represents the current value of a computation and is initially set to 1. The variable index represents the number of times remaining to perform the computation and is initially set to 3. The results in Table 2 assume the data primitives are executed in order, and it should be understood these values and results are merely illustrative.

TABLE 2

| Data space primitive of Table 1 applied to Example 1 | Result |
| --- | --- |
| (insert-entry! factorials (tuple(id 100) ) (tuple( (current 1) (index 3) ) ) ) | Sets the value-tuple (1, 3) for key-tuple 100 in factorials and returns true |
| (set-entry! factorials (tuple(id 100) ) (tuple( (current 1) (index 3) ) ) ) | Sets the value-tuple (1, 3) for key-tuple 100 in factorials and returns true |
| (fetch-entry factorials (tuple(id 100) ) ) | Returns the value-tuple (1, 3) for key-tuple 100 in factorials |
| (delete-entry! factorials (tuple(id 100) ) ) | Deletes the key-tuple/value-tuple pair for key-tuple 100 and returns true |

When applied within the source code of a smart contracting language, data maps beneficially provide the ability to store a state associated with a smart contract so that other users that interact with the smart contract through transactions on the blockchain can read and mutate that state. Once again, an important benefit of data maps and the foregoing data primitive functions is that they allow a VM, at the time of calling a smart contract, to perform static analysis on the smart contract. The inventors realized that, when, for example, the data type of the key-tuples, the data types of the return values of the functions in the smart contract, and the input sizes in a smart contract are known at the time of calling a smart contract, then static analysis can be implemented to infer the output sizes.

The foregoing principles can be applied to a smart contract in the following example. This (purely example) smart contract computes an arbitrary factorial. Typically, computing a factorial is a Turing complete task. This example therefore expresses a Turing complete computation in Turing incomplete language. The example implements data maps to allocate data and defines functions for manipulating the allocated data. The functions are iterative and, in practice, would be called repeatedly until the smart contract output indicated that the desired computation had completed. This concept is developed below.

```
(define-map factorials
    ( (id int) ) ( (current int) (index int) ) )
(define (init-factorial (id int) (value int) )
    (insert-entry! factorials
        (tuple(id id) )
        (tuple(current 1) (index value) ) ) )
(define (compute (id int) )
    (let ( (entry (fetch-entry factorials (tuple(id id) ) ) ) )
    (if (eq? entry 'null)
        'false
        (let ( (current (get current entry) )
            (index (get index entry) ) )
        (if (<= index 1)
            current
            (begin
                (set-entry! factorials
                    (tuple(id id) )
                    (tuple(current (* current index) )
                        (index (- index 1) ) )
                0) ) ) ) )
```

Example 3

The foregoing smart contract defines a data map called factorials. The data map factorials stores a mapping from integer identifiers to a current state of computation. The current value and index integer can be used to determine the progress in computing any given factorial. To compute the factorial, the smart contract multiplies the current value (initially, 1) by a given index value (e.g., 4 or any desired number), stores the result as the new current value and decrements the index value by 1. The computation is repeated until the index is 1 or 0.

This example smart contract defines two public functions, init-factorial and compute. The public functions of a smart contract are the sub pieces of the smart contract. Preferably, they are defined in the same smart contract because (as shown here) data maps are modified by the functions defined in their own smart contract. Preferably, one smart contract does not directly update data allocated in the data map of another, distinct smart contract.

The first function (init-factorial) initializes a factorial computation. Here, value represents the value the factorial is to be computed over. The init-factorial function calls the data primitive function insert-entry! which instantiates the key-tuple/value-tuple pair by inserting an entry into the data map. In the calculation, the current value always starts at 1 and index is the value to compute the factorial over.

The second compute function steps the computation. By calling the fetch-entry primitive function, the compute function fetches the current value-tuple for a given value (id) of the key-tuple id from the data maps. The compute function then checks whether that entry existed. If fetch-entry returned 'null, the compute function returns 'false and it backs out of the transaction. If it does exist, then the compute function checks whether the computation should be complete. If the index value is already equal to 1, the factorial is done being computed, and the compute function returns the current value. Otherwise, the compute function performs the next iteration of the factorial computation and stores the result back into the factorials data map with the set-entry! data primitive function.

The set-entry! data primitive function sets the value-tuple for the id key-tuple to the stepped computation, and compute function then decrements the index and returns 0. The reason the compute function returns 0 is to provide an indication that the smart contract should be called again to get the actual factorial number (that is, the factorial is still in iteration and not yet complete).

To illustrate, assume that a user calls the function init-factorial in the smart contract with the arguments 100 4. The number 100 could represent a number for tracking the user or the originating transaction, for example. It is not a value used to compute the factorial, but rather to allocate in the data map the numbers used in computing the factorials and differentiates between different transactions calling the same smart contract code. The number 4 represents the number to compute the factorial over. Accordingly, the computational number 4 is assigned to a particular user or transaction 100 in the data map. Accordingly, after the data primitive function insert-entry is called, id is 100, current is 1, and index is 4. Table 3 below illustrates that the compute function will return 0 until index is equal to 1, and then the compute function will always return 24.

TABLE 3

| compute iteration | set-entry arguments | | | compute returns |
| --- | --- | --- | --- | --- |
| | id | current | index | |
| 1 | 100 | 4 | 3 | 0 |
| 2 | 100 | 12 | 2 | 0 |
| 3 | 100 | 24 | 1 | 0 |
| 4 | 100 | 24 | 1 | 24 |
| 5 | 100 | 24 | 1 | 24 |

As shown above, the functions called in a smart contract typically return a Boolean result or a known value as indicated. This feature, coupled with the non-compiled source code, allows for the blockchain system to "back out" of a smart contract more easily than in existing systems. If the transaction returns true or returns an expected value, then it is considered valid and any changes made to the blockchain state will be materialized. If a transaction returns false, the transaction will be considered invalid and the transaction will have no effect on the smart contract's state. In some embodiments, the transaction may incur a transaction fee debit, in the case of on-chain transactions.

This code is merely illustrative of how data maps and data primitive functions could be implemented within an example smart contract definition; it is not a limiting embodiment. Smart contracts have diverse applications. For example, a smart contract can be applied in the context of a cryptocurrency with accounts and holdings. Instead of an integer identifier, the identifier could correspond with a principal (discussed in greater detail below). Instead of mapping to a partial computation, the smart contract could map to an integer account value such as the amount of cryptocurrency or token held. The smart contract functions could allow used to transfer and check values.

In at least one embodiment, when the smart contract is initially published to the blockchain network, the nodes on the blockchain network perform static analysis on the data map and functions defined in the smart contract. For example, each node can independently check that the received source code represents a compliant definition of a smart contract, analyze how much storage is needed for the defined data maps (such as the factorials data map shown above), determine how much storage will change when the functions within the smart contract may be called (such as the init-factorial and compute functions shown above), and/or the determine the input and output sizes at the time of publishing. To be clear, the smart contract is not necessarily executed when it is published. Rather, the static analysis can occur with publication.

An inventive smart contract runs on any node in the blockchain network. Within the blockchain network, the code to run the smart contract is akin to a transaction. A participant in the network desiring to execute smart contract functionality would send transactions out with some representation of a function name previously defined within the smart contract upon publication, along with arguments for the function. When the function calls get included in the blockchain, any node participating in the network will run the functions within the context of the appropriate smart contract. And the relevant data map is also stored on each node. In this way, an inventive smart contract is capable of running on any node in the blockchain network.

Again, in a blockchain network, every node in the network executes every transaction. Conceptually, the nodes are receiving a chain of transactions (Tx0, Tx1, Tx2, Tx3, . . . ). The nodes run the transactions so they can update their own states and verify whether the transactions completed successfully. Because the chain of operations is the same for all nodes, they should all arrive at the same state (notwithstanding a bug in the implementation).

Here, factorials not only represents the name of the data map, it also identifies the smart contract. The public functions of the smart contract (like init-factorial) are the conceptual sub pieces. The data map for factorials and the public functions are in the same smart contract because data maps are modified by functions defined in their own smart contract. Within a blockchain network, a transaction calls a public function (which in turn can modify its associated data map) previously defined in a smart contract published to the blockchain network.

Figure 4:
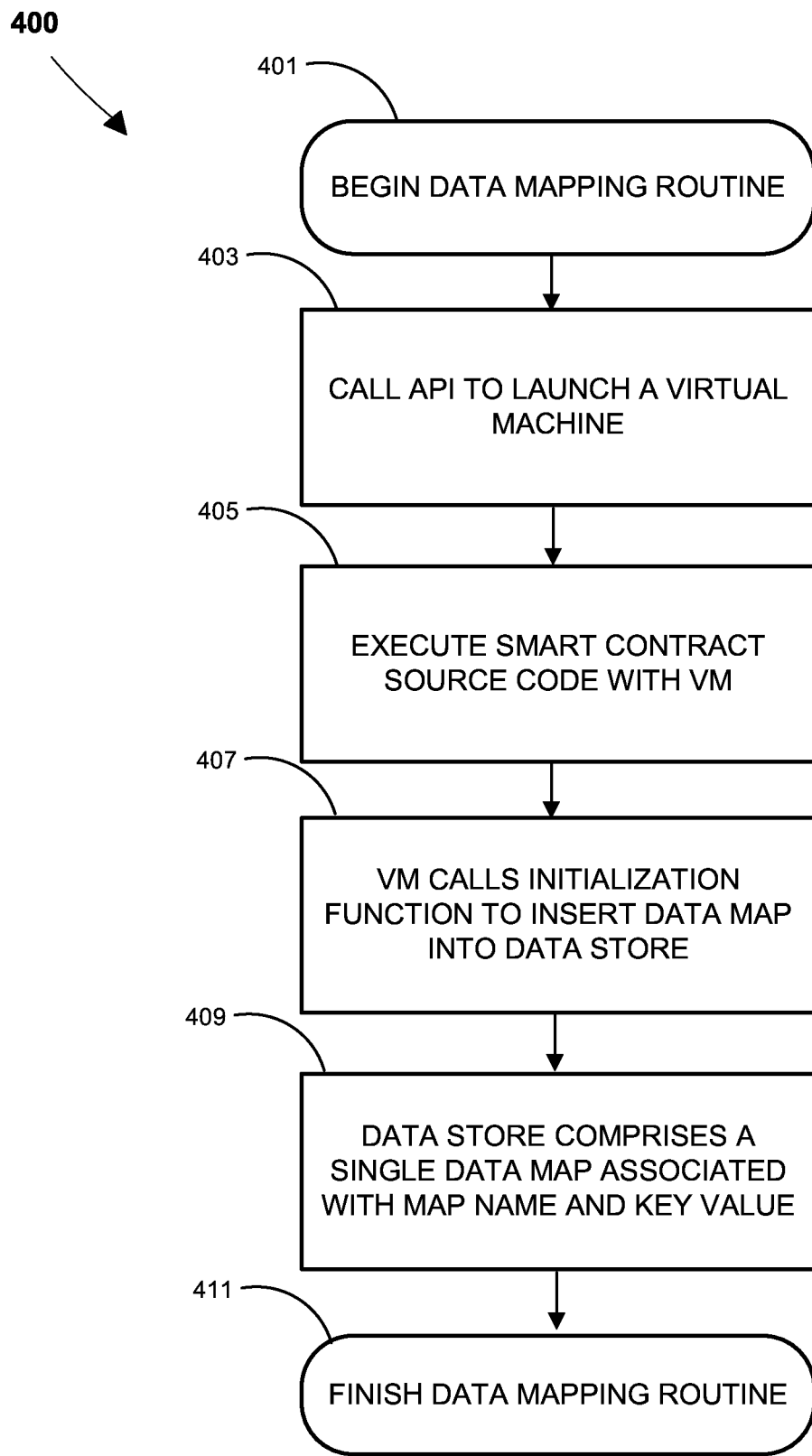
FIG. 4 provides a routine for performing processing data maps.

FIG. 4 provides a routine 400 for performing processing data maps. The routine begins at block 401. In block 403, the routine calls an application program interface to launch a virtual machine. In block 405, the routine executes the smart contract source code using the virtual machine. In block 407, the virtual machine calls an initialization function that inserts a data map into the data store as defined by the data map schema, the inserted data map comprising the map name defined in the smart contract source code, a key value defined in the transaction for the key, and a first value from the transaction for the value. In block 409, after initialization, the data store comprises a single data map associated with a combination of the map name and the key value. The routine ends at block 411.

Contract Publishing and Static Analysis

As discussed above, various embodiments discussed in this disclosure present a technical solution to a technical problem raised by the Ethereum model. The inventors realized that the Ethereum model presents a technical problem: because Ethereum is Turing complete, the Gas cost required to complete a smart contract cannot be known before the smart contract completes execution. Various embodiments of the novel smart contracting implementations in this disclosure provide the ability to statically analyze smart contract transactions to get accurate upper-bound estimates of transaction costs (including runtime and storage requirements) as a function of input lengths. By limiting, for example, the data types supported, the ability to recurse, and the ability to iterate, the smart contracting implementations are amenable to such static analysis.

The inventors realized that, when any function within the smart contracting language specification has an output length bounded by a constant factor of the input length, then statically computing runtime or space requirements can be accomplished by associating each function in the language specification with a function to statically determine cost as a function of input length. Although some functions within the smart contract language (such as fetch-entry) will output values larger than the function's input, these outputs will be bound by statically inferable constants. For example, the data function fetch-entry will always return an object whose size is equal to the specified value type of the data map.

The inventors also realized that the smart contracting language should be received as source code by the participating nodes on the blockchain network. Many blockchain networks use a compiler to translate from a friendly high-level language to a lower-level language deployed on the blockchain. Various embodiments include the inventive realization that such an architecture can present problems. A bug in such a compiler could lead to a bug in a deployed smart contract when no such bug exists in the original source. This is problematic for recovery. A hard fork would be required to undo any transactions completed with the bug. This hard fork would likely be contentious because it would not be easy to deduce which contracts were affected and for how long. In contrast, bugs in the VM present a clearer case for a noncontentious hard fork: the smart contract was defined correctly, as all participants can see directly from the uncompiled source code on the chain, but illegal transactions were incorrectly marked as valid. Accordingly, in various embodiments the smart contracting source code is embodied in a non-compiled high level language. The language can be a Lisp like language (LLL) (including Lisp).

Smart contracts have two basic interactions with the blockchain: publishing the smart contract and executing the smart contract. When publishing a smart contract, the recipient nodes can each validate correctness and perform static analysis of output sizes.

Validating correctness is optional, although desirable. Where implemented, such validation can comprise one or more functions defined by the blockchain administrator. For example, in some implementations validating correctness can comprise one, some, or all of the following checks: confirming the smart contract functions have no recursion or anonymous functions; confirming that looping is limited to map, filter, and fold functions; data types are known to be acceptable (such as Booleans, integers, fixed-length buffers, and principals, and lists of these known acceptable data types); confirming that the only variable length lists in the language appear as transaction inputs (i.e., there are no operations like append or join); confirming that variables are created via let binding instead of mutating functions like set; confirming that constants and functions are syntactic (that is, any constants and functions must be able to be inlined with the body of the smart contract or the smart contract will be rejected as illegal); and confirming that functions are defined via an appropriate statement (such as define) followed by the selected function name, wherein any arguments to the function are specified and such arguments have a known, acceptable data type The inventors discovered that static analysis becomes possible with the embodiments disclosed herein because the Turing incomplete (finite) language guarantees the calculations will succeed. When executing a smart contract, a node computes the cost of executing using the static analysis performed at the time of publication. A fee is charged based on the calculated cost. The nodes each perform the computationally intensive work to analyze the smart contract at the time of publication. With this approach, when a user requests execution of the smart contract, the intensive computations required to calculate the appropriate fee are already complete. When the user tries to execute a smart contract, the nodes can determine whether the user had paid a high enough fee almost immediately.

The high-level approach for static analysis can employ a parse tree generator and static analyzer. A parse tree is a set of labeled tree nodes with labeled edges connecting them. The tree nodes represent different parts of the parse tree. The labels on the nodes represent the type of syntactic structure represented by the node. It should be understood that the term "parse tree" is used broadly in this disclosure and encompasses abstract syntax trees. It also should be understood that "tree node" is distinct from a blockchain node. The former is a part of a parse tree. The latter is a computing device within a blockchain network.

LLLs can be beneficially used in embodiments described herein, not only because they are not compiled, but also because they have source code that can be visualized as a tree structure. Each tree node of the parse tree denotes a construct occurring in the source code. The resulting parse tree does not represent every detail appearing in the real source code, but rather just the structural, content-related details. For instance, grouping parentheses are implicit in the parse tree structure, and a syntactic construct like an if-condition-then expression may be denoted with a single node with three branches.

To build the parse tree, a node executes program instructions of a parsing program that takes at least the smart contract name as an argument. When the smart contract is published, the program instructions are executed on each receiving node, with a library outside the VM library (or a different part of the library). It could be executed in the same process as the VM, for example, but a different part of the library.

To parse the parse tree, a VM instance on each blockchain node executes instructions of a static analyzer program traversing the parse tree from the top to the bottom and identifying each function and each parameter (variable), represented in the tree nodes of the parse tree. Again, the program instructions can be executed by each receiving node, outside the VM, when the smart contract is published.

The tree nodes can be associated with one or more data tables stored on the VM, the data tables storing characteristics of the smart contract functions and parameters. For example, a data table can store run time data associated with each native function (such as set-entry! or fetch-entry) called in a smart contract. When the static analysis encounters a public function defined in the smart contract, the static analysis can recursively analyze the public function for any native functions called within the public function. In this way, the static analysis scans over the parse tree and performs table look ups for the tree nodes.

Figure 5:
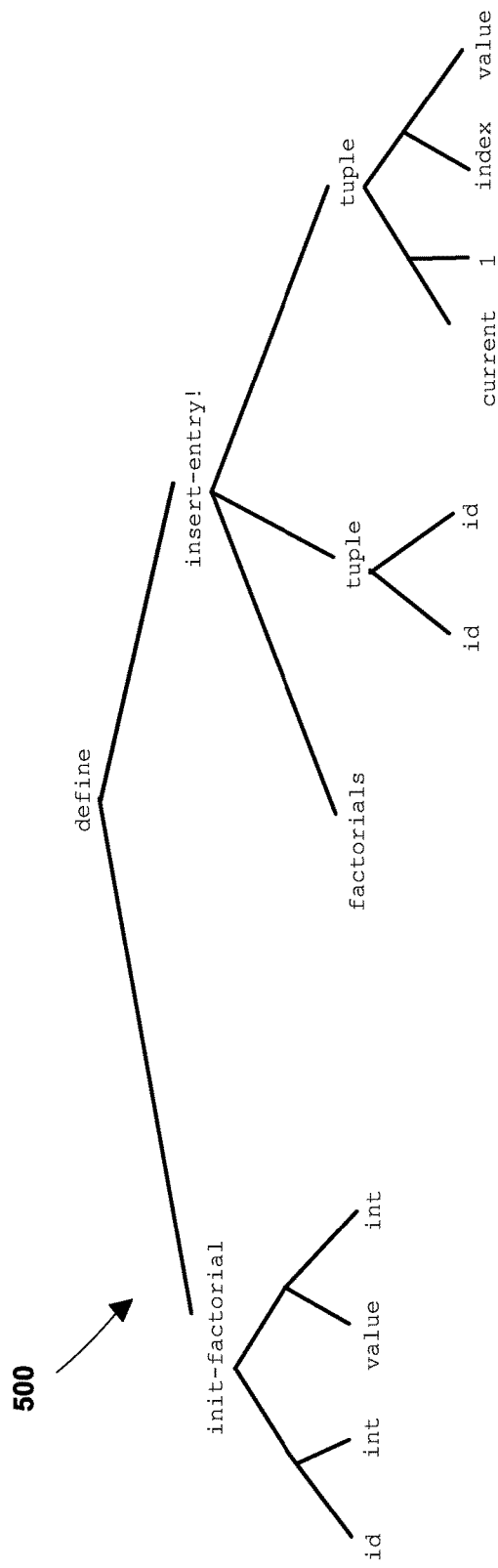
FIGS. 5 and 6 show example parse trees.

An example parse tree 500 for the init-factorial function of Example 3 is shown in FIG. 5.

Again, in embodiments described in this disclosure, public function calls specify a data type for their arguments. For example, the argument (value int) specifies the data type integer, corresponding to a known maximum data size of 128 bits. An argument comprising a list of up to three integers (value (list int 3)) would correspond to a known maximum data size of 384 bits.

By descending through the parse tree and performing associated table lookups for the identified functions and parameters, the static analyzer program can identify each function and determine the cost of running that function. The cost depends on the data map in which an entry is to be inserted. But because the map name is known and the data map has been defined within the smart contract with known data types of known size, the static analyzer can predict what the input and output sizes must be. In this regard, the analysis is pessimistic. For example, if a public function specifies that it accepts a list of up to three 3 elements, the static analyzer will determine the cost assuming the list will include 3 elements, even if in a particular transaction a lower number is input.

Runtimes associated with functions can be determined empirically or based on actual measurements. In various embodiments, higher runtimes are associated higher costs.

Example 3 does not include a public function that calls another public function. But the parsing program and static analyzer can provide for this situation. Example 4 defines a third public function (internal-compute) for the smart contract of Example 3.
(define internal-compute (x int)
 (y int)
 (+y x))

Example 4

Figure 6:
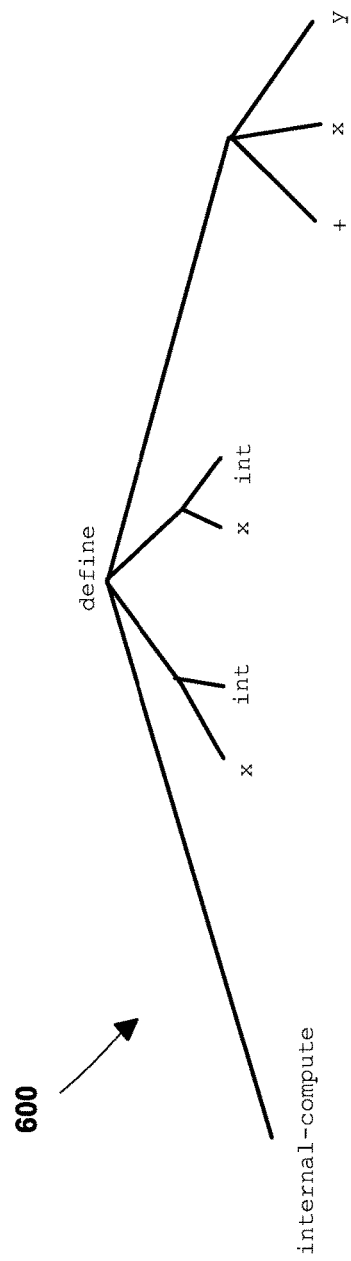

Assuming compute were not for calculating a factorial, but rather a different number that involved adding two integer numbers, it could include a call to the public function internal-compute because they are in the same smart contract. The corresponding node tree for compute would reflect the call to internal-compute. When performing static analysis on the node tree, the static analyzer would try to look up internal-compute in the data table. Upon determining that it has no associated data, the static analyzer would analyze internal-compute, as defined in the smart contract, to determine its own parse tree 600, shown in FIG. 6.

Because the function (addition) within internal-compute is a native function with definite properties, and because x and y are integers of maximum known size, the static analysis on internal-compute can complete. The static analysis data for internal-compute can be stored in the data table or otherwise mapped to the public function and the static analyzer could resume analyzing the function (compute) that called internal-compute. Here, the known output size for internal-compute would be 128 bits because the function returns an integer (the sum of two integers). The input size would be 256 bits (the size of two integers).

Example 5 shown below is an example of a recursive function call.
(define internal-compute (x int)
 (y int)
 (if y 0) x
 (internal-compute x (−y 1))

Example 5

This recursive function is preferably disallowed by the language because recursive functions are not guaranteed to resolve through static analysis. To implement a recursive scheme, the smart contract should desirably use an iterative approach. The compute function of Example 3 provides an example of implementing a recursive scheme over iterations. Each iterative step of the recursion will require calling the function with a distinct blockchain transaction.

Figure 7:
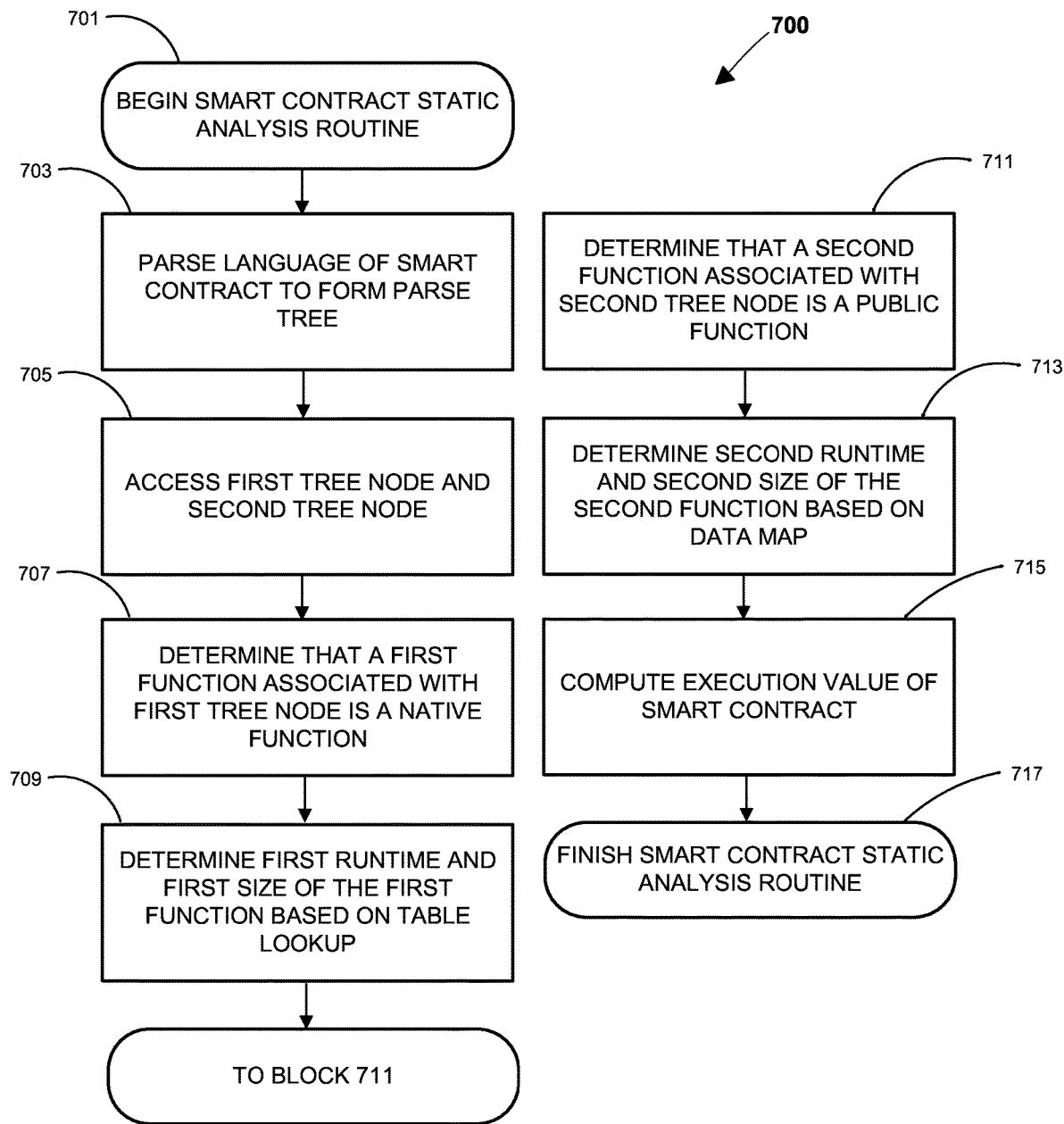
FIG. 7 provides a routine for performing static analysis of a smart contract.

FIG. 7 provides a routine 700 for performing static analysis of a smart contract. The routine begins at block 701. In block 703, the routine parses language of the smart contract to form a parse tree comprising tree nodes. Each tree node corresponds to a public function of the smart contract or a parameter thereof.

In block 705, the routine accesses a first tree node and a second tree node of the tree nodes.

In block 707, the routine determines that a first function associated with the first tree node is a native function generally applicable to the smart contracts received by the network interface. In block 709, when the first function is determined to be a native function, the routine determines a first runtime and a first size of the first function based on a table lookup.

In block 711, the routine determines that a second function associated with the second tree node is a user-defined (public) function applicable within the first smart contract. In block 713, when the second function is determined to be a user-defined function, the routine determines a second runtime and a second size of the second function based on a data map defined in the first contract and associated with the second function. The data map comprising a map name, a key-tuple, and a value-tuple, the map name uniquely associating the key and the value, and the value having a static maximum size related to the size of the second function.

In block 715, the routine computes an execution value of the first smart contract based on the first runtime, the first size, the second runtime, and the second size. The routine ends at block 717.

In summary, the smart contracting embodiments in this disclosure employ static analysis to determine properties of functions before executing those functions with a transaction. These configurations beneficially allow for the VM to count the total number of runtime operations required, the maximum amount of database writes, and/or the maximum number of calls to any expensive primitive functions like database reads or hash computations. In certain embodiments, translating that information into transaction costs further requires more than counting those operations. It requires translating the operations into a single cost metric (akin to Ethereum Gas) with empirical or measured data for the functions. Then, clients can set the fee rate for that metric, and pay the corresponding transaction fee. Notably, unlike Turing complete smart contracting languages, any such fees are known before executing the transaction, such that clients will no longer need to estimate Gas fees to complete a transaction.

Contract Principals

One of the data types identified with respect to static analysis is "principal." A principal in the context of a smart contract is an entity capable of proving ownership over something, such as a digital asset. Most assets in a blockchain will be "owned" by objects of the principal type, and any object of the principal type may own an asset. The value of the variable associated with the principal data type can be, for example, the transaction sender's public-key hash or a multi-signature address. A given principal can operate on their assets by issuing a signed transaction on the blockchain.

Principals are defined by the blockchain protocol. Different kinds of principals exist in blockchain networks, including single signature principals (one public key proves who the sender is) and multi-signature principals (where n of m public keys prove who the sender is). In existing blockchain networks, a VM (such as EVM) can check whether a smart contract transaction was signed by a certain principal (that is, the principal can be used to check that a specific entity sent that transaction). Blockchain networks have used smart contracts to prove who a sender is in the context of a multi-signature principal. For example, in Bitcoin, Bitcoin script can encode a multi-signature owner for a particular coin. Ethereum has a parity multi-signature wallet.

The inventors realized, however, that a smart contracting language should use a globally (natively) defined variable to obtain the current transaction's principal (signer), such that the principal can be used for uses besides quality checks. Within the global scheme of the smart contracting language, this variable can be defined with a name like tx_sender or tx-sender or any other arbitrarily defined name.

Example 6 below changes the data type for the key-tuple id from int to principal. Instead of receiving a value id passed from a public function call in a transaction, the init-factorial and compute functions receive a value tx_sender associated with the transaction that corresponds with the public key of the entity sending the transaction. With this change, the transaction principal can initiate and continue a computation because the tx_sender is unique to the transaction principal.

```
(define-map factorials
    ( (id principal) ) ( (current int) (index int) ) )
(define (init-factorial (value int) )
    (insert-entry! factorials
        (tuple(id tx_sender) )
        (tuple(current 1) (index value) ) ) )
(define (compute)
    (let ( (entry (fetch-entry factorials (tuple(id tx_sender) ) ) )
    (if (eq? entry 'null)
        'false
        (let ( (current (get current entry) )
            (index (get index entry) ) )
        (if (<= index 1)
            current
            (begin
                (set-entry! factorials
                    (tuple(id tx_sender) )
                    (tuple(current (* current index) )
                        (index (- index 1) ) )
                0) ) ) )
```

Example 6

With this change, initializing a factorial computation with init-factorial requires only passing the value to compute the factorial over, without need for passing an additional identifier value. This disclosure encompasses the inventive realization that, because the transaction itself is signed with the public key for the transaction sender, that public key does not need to be passed to the function as an argument but nevertheless can be used in functions within the smart contract. Note that, in this source code, init-factorial can be called only once to initialize a single factorial. After calling init-factorial with a value such as 4, calling init-factorial with a value such as 5 will result in an error because the key-tuple id with value tx_sender already exists. It should be understood this is not a limitation or teaching away of using tx_sender within a smart contract. It is merely a characteristic of this example smart contract.

This example illustrates that a global blockchain variable like tx_sender that designates the transaction sender or other transaction ownership property can be implemented within a smart contract to embed a metric of ownership over something in the smart contract. In a practical implementation, a smart contract according to the embodiments in this disclosure can define a data map and functions for a multi-signature wallet. The data map would allocate the number of signatures required to release funds from the wallet and the list of principals associated with the wallet. A function of the smart contract would check to ensure tx_sender is one of the principals and, if it is, partially unlock the wallet. Another transaction from another sender (with a distinct tx_sender value) calls the function of the smart contract and potentially unlocks another part of the wallet.

The tx_sender variable does not change during inter-contract calls. That means that, if a function is called for a given smart contract, that function can, in turn, make calls into other smart contracts on the transaction sender's behalf. This feature may be less desirable in Turing complete languages because of security concerns. In the context of the Turing incomplete languages described in this disclosure, however, a client knows a priori which functions a given smart contract can possibly call. This feature beneficially can be used to mitigate security risks that may arise in the context of implementing inter-contract function calls in Turing complete languages.

As discussed above, assets in the smart contracting language and blockchain will be "owned" by objects of the principal type. Any object of the principal type may own an asset. For the case of public-key hash and multi-signature addresses, a given principal can operate on their assets by issuing a signed transaction on the blockchain.

In some embodiments, smart contracts themselves (re-represented by the smart contract identifier) can be principals. This functionality is innovative because there is no private key associated with a smart contract, and smart contracts cannot broadcast signed transactions on the blockchain. In such embodiments, this functionality is implemented by a novel function call (for example, as-contract) defined in the global scheme. The function call can be defined to change what tx_sender resolves to, such that tx_sender resolves to the smart contract. This functionality allows contracts to own assets themselves, apart from any given user.

This function will execute the closure (passed as an argument) with tx-sender set to the smart contract's principal, rather than the current sender. It returns the return value of the provided closure. A smart contract may use the special variable contract-principal to refer to its own principal.

For example, a smart contract could implement a "token faucet." Faucets are a way to get a small amount of tokens. Faucets are frequently used for testing wallets and learning about cryptocurrencies without joining an exchange. For example, the most common faucet sites allow users to claim a small amount of Bitcoins or altcoins by solving a captcha. The smart contract source code could specify, as in Example 7:

```
'''scheme
(define (claim-from-faucet)
(if (isnull? (fetch-entry claimed-before (tuple sender tx_sender)))
(let ((requester tx-sender))
(insert-entry! claimed-before (tuple sender requester) (tuple claimed 'true))
(as-contract (transfer! requester 1)))))
'''
```

Example 7

Here, the defined function claim-from-faucet: 1) checks if the sender tx-sender has claimed from the faucet before; 2)

assigns tx_sender to a requester variable; and 3) adds an entry to the claimed-before data map. The transaction then calls as-contract with another function transfer! as an argument. To interact with balances, a smart contract may call a defined function like transfer! to attempt to transfer from the current principal. Here, in this example, the transfer! predefined function requires the operation to have been signed by the transferring principal and also accepts an integer value specifying the maximum amount of coins spendable in a single transfer. Like any other smart contract transaction, this function call returns true if the transfer was successful, and false otherwise. The as-contract function therefore sends 1 coin signed by the transferring principal.

A corresponding primitive function is-contract? similarly can be defined in the global scheme. This function can be used to determine whether a given principal corresponds to a smart contract.

As shown above, as-contract (or any other suitable function name for performing the function as defined in the global scheme) would be called within a smart contract. Returning again to the factorials example, if the factorials contract were desired to "own" one of the computations, the definition define init global could be inserted to define a global factorial that we are computing over. Here, for example, above insert-entry!, the contract would call as-contract, as shown in Example 8.
(define (init-factorial (value int))
 (as-contract
 (insert-entry! factorials
 (tuple (id tx_sender))
 (tuple(current 1) (index value)))))

Example 8

So when the VM executing the code looks up who tx_sender is, instead of returning the user who called the function, the code would return the contract's principal. This functionality is preferably limited to being callable within the context of the transaction. This limitation reduces the likelihood that a network participant trying to call these functions could not arbitrarily call as-contract and then try to execute functionality maliciously.

Figure 8:
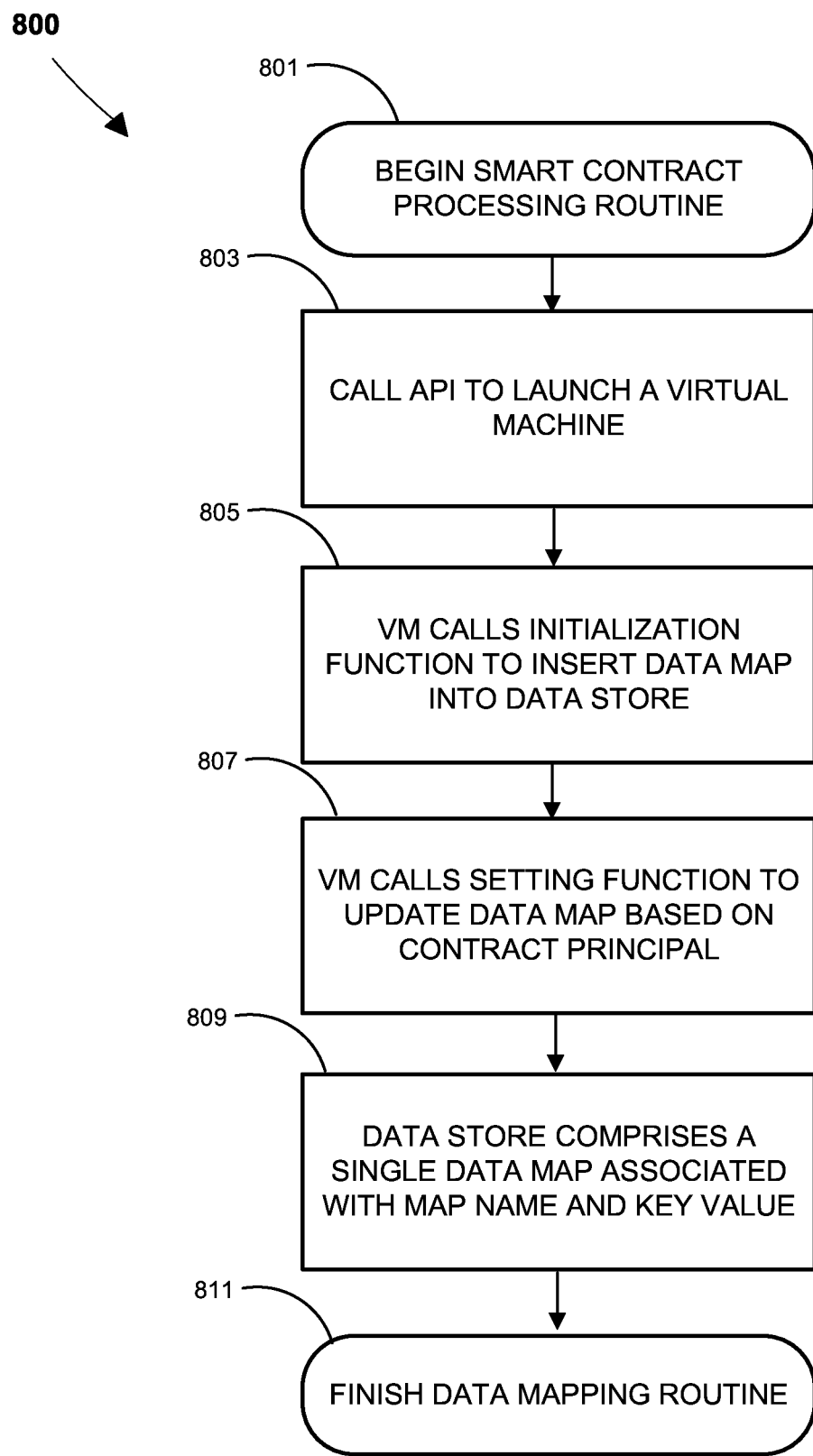
FIG. 8 provides a routine for processing a smart contract utilizing a native field name associated with the principal.

FIG. 8 provides a routine 800 for processing a smart contract utilizing a native field name associated with the principal. The routine begins at block 801. In this context, a first transaction of a plurality of transactions comprises a public key capable of identifying a principal that created the first transaction, and a second transaction of the plurality of transactions comprises the public key from the first transaction. A first smart contract source code of defines a data map schema comprising a map name, a key, and a value, and the key is associated with a native field name associated with the principal.

In block 803, the routine calls an application program interface to launch a virtual machine. In block 805, the routine executes the first smart contract source code using the virtual machine. In block 807, the virtual machine calls an initialization function that inserts a data map into the data store as defined by the data map schema, the inserted data map comprising the map name defined in the first smart contract source code, a value of the principal for the key, and a first value from the first transaction for the value. In block 809, the virtual machine calls a setting function that updates the data map in the data store, the updated data map comprising the map name, the value of the principal for the key, and a second value from the second transaction for the value. With this configuration, after initialization, the data store comprises exactly one data map associated with the combination of the map name and the value of the principal. The routine ends at block 811.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computing device of a decentralized network comprising:
   a network interface configured to couple the computing device to the decentralized network and to receive a plurality of smart contract source codes and a plurality of transactions therefrom, wherein:
      a first transaction of the plurality of transactions is signed by a public key that identifies a principal that created the first transaction,
      a second transaction of the plurality of transactions is signed by the public key,
      a first smart contract source code of the plurality of smart contract source codes defines a data map schema comprising a map name, a key, and a value, and
      the first smart contract source code comprising an initialization function and a second function, wherein the initialization function references a global variable that has an identifier value that corresponds with a public key associated with an entity that signs a transaction that calls the initialization function, and wherein the second function references the global variable that has an identifier value that corresponds with a public key associated with an entity that signs a transaction that calls the second function;
   a data store;
   a hardware processor; and
   a non-transitory computer readable storage medium storing program instructions for execution by the hardware processor in order to cause the computing device to:
      call an application program interface to launch a virtual machine,
      execute the first smart contract source code using the virtual machine,
      with the virtual machine, call the initialization function without passing an identifier value of the global variable that corresponds with the public key that identifies the principal as an argument to the initialization function, wherein the initialization function, based on the first transaction being signed by the public key that identifies the principal, uses the identifier value of the global variable that corresponds with the public key that identifies the principal to insert a data map into the data store as defined by the data map schema, the inserted data map comprising the map name defined in the first smart contract source code, the identifier value of the global variable that corresponds with the public key that identifies the principal for the key, and a second value from the first transaction for the value,
      wherein, after initialization, the data store comprises exactly one data map associated with the combination of the map name and the identifier value of the global variable that corresponds with the public key that identifies the principal, and
      with the virtual machine, call the second function without passing the identifier value of the global variable that corresponds with the public key that identifies the principal as an argument to the second function, wherein the second function, based on the second transaction being signed by the public key that identifies the principal, uses the identifier value of the global variable that corresponds with the public key that identifies the principal to retrieve the data map from the data store and updates the data map in the data store, the updated data map comprising the map name, the identifier value of the global variable that corresponds with the public key that identifies the principal for the key, and a third value from the second transaction for the value.

2. The computing device of claim 1, wherein the key is a first n-tuple, and the value is a second n-tuple.

3. The computing device of claim 1, wherein the key is characterized by a principal data type of static maximum size or a fixed-length list thereof.

4. The computing device of claim 1, wherein the identifier value of the global variable that corresponds with the public key that identifies the principal is the public key that identifies the principal or a hash thereof.

5. The computing device of claim 1, wherein the virtual machine and is configured to access a plurality of primitive functions available through a shared resource for all smart contract source codes published in the decentralized network.

6. The computing device of claim 5, wherein the initialization function is embodied in one or more of the primitive functions.

7. The computing device of claim 5, wherein the primitive functions comprise the second function.

8. The computing device of claim 5, wherein the smart contract source code further defines a public function.

9. The computing device of claim 8, wherein the public function comprises calls to one or more of the primitive functions.

10. The computing device of claim 1, wherein the program instructions, when executed, cause the computing device, with the virtual machine, to call a fetching function that retrieves the value from the inserted data map based on the map name and the key value.

11. The computing device of claim 1, wherein the program instructions, when executed, cause the computing device, with the virtual machine, to call a deleting function that deletes the inserted data map based on the map name and the key value.

* * * * *